United States Patent [19]

Hagiwara et al.

[11] Patent Number: 4,979,601
[45] Date of Patent: Dec. 25, 1990

[54] VISCOUS FLUID COUPLING WITH REDUCED SCATTER

[75] Inventors: Mitsutoshi Hagiwara; Ryuji Nakamura, both of Toyota, Japan

[73] Assignee: Aisin Seiki Kabushiki Kaisha, Kariya, Japan

[21] Appl. No.: 414,763

[22] Filed: Sep. 29, 1989

[30] Foreign Application Priority Data

Sep. 28, 1988 [JP] Japan .................................. 63-127453

[51] Int. Cl.⁵ .............................................. F16D 35/00
[52] U.S. Cl. ................................................. 192/58 B
[58] Field of Search ................... 192/58 R, 58 A, 58 B

[56] References Cited

U.S. PATENT DOCUMENTS

| | | | |
|---|---|---|---|
| 1,739,390 | 12/1929 | Eaton | 192/58 A |
| 2,902,127 | 9/1959 | Hardy | 192/58 B |
| 3,259,221 | 7/1966 | Godfrey | 192/58 B |
| 3,272,293 | 9/1966 | Heater | 192/58 R |
| 3,648,811 | 3/1972 | LaFlame | 192/58 B |
| 3,741,359 | 6/1973 | Leichliter | 192/58 B |
| 3,990,556 | 11/1976 | Hayashi et al. | 192/58 B |

*Primary Examiner*—Richard Lorence
*Attorney, Agent, or Firm*—Oblon, Spivak, McClelland, Maier & Neustadt

[57] ABSTRACT

A viscous fluid coupling has a rotor including peripheral teeth with distal ends closely facing an inside surface of an output member. The distal ends of the teeth form flat surfaces parallel with the output member to form a rotary seal therewith, which reduces variations in the rotational speed of the output member.

4 Claims, 3 Drawing Sheets

Air-Temparature detected by the bimetal

VISCOUS FLUID COUPLING WITH REDUCED SCATTER

BACKGROUND OF THE INVENTION

1. Field of the Invention:

The present invention relates to a viscous fluid coupling which can be used with a fan for cooling an automotive engine.

2. Description of the Related Art:

A conventional viscous fluid coupling according to Japanese patent application No. 62-013859, filed Jan. 23, 1987, and disclosed in related U.S. Pat. No. 4,880,095, is shown in FIG. 4. There, a bimetal 7 as a temperature-responsive member opens a valve 9 via a rod 8 when the ambient temperature is increased to a high temperature. Then, the viscous fluid flows into a fluid chamber divided by a rotor 1 into first fluid chamber 5a and a second fluid chamber 5b, from a first reservoir 6a. Under this condition, torque is transmitted from an input member 2 to a casing 3 as an output member via the rotor 1, and a fan (not shown) rotates. At this time, the fluid is pumped from a second reservoir 6b into the first and second fluid chambers 5a and 5b through a hole 17 in a rear plate 16, via a pump projection 19. Torque-transmission is controlled by a degree of the opening of the valve 9. Element 4 is a cover mounted to the casing 3.

During operation of this viscous fluid coupling, the fluid in the fluid chambers 5a and 5b is also being returned to the first reservoir 6a due to the following pumping action. That is, a pumping action is generated between a casing 3 and plural angled teeth formed on the rotor 1 (FIG. 3), each of which is oriented toward a rotating direction of the rotor 1, thereby returning the viscous fluid to the first reservoir 6a from the first and the second fluid chambers 5a and 5b during rotation of the rotor.

However, the rotational speed of the output rotational member, i.e., the casing 3, varies relative to the rotational speed of the input member 2 for a given detected air temperature. This is shown in FIG. 5. That is, it has been found that for a given detected air temperature the fan speed Nf can be variable, i.e. scatter, within the shaded area.

SUMMARY OF THE INVENTION

It is, therefore, a primary object of the present invention to provide a viscous fluid coupling without the aforementioned drawback.

The above, and other, objects are achieved according to the present invention by a viscous fluid coupling comprising an input member, an output member rotatably mounted on the input member, a rotor fixed to the input member and positioned in the output member, and a viscous fluid in the output member. A plurality of teeth are formed at an outer periphery of the rotor, each of the teeth having distal ends closely facing an inside surface of the output member. The distal ends of the teeth form flat surfaces parallel with the output member to form a rotary seal with the output member. Torque is transmitted from the input member to the output member by the viscous fluid.

According to a further feature of the invention, the teeth are oriented toward a rotating direction of the rotor so that the viscous fluid is pumped by the teeth during rotation of the rotor.

According to a further feature of the invention, V-shaped grooves are formed between adjacent ones of the teeth.

According to a further feature of the invention, a width L of each of the distal ends of the teeth in an axial direction of the rotor is between 1 mm and 5 mm, preferably between 2 and 4 mm.

BRIEF DESCRIPTION OF THE DRAWINGS

The above and other objects, features and advantages of the present invention will become more apparent and more readily appreciated from the following detailed description of preferred exemplary embodiments of the present invention, taken in connection with the accompanying drawings, in which.

DETAILED DESCRIPTION OF THE PREFERRED EMBODIMENTS

Figure 1:
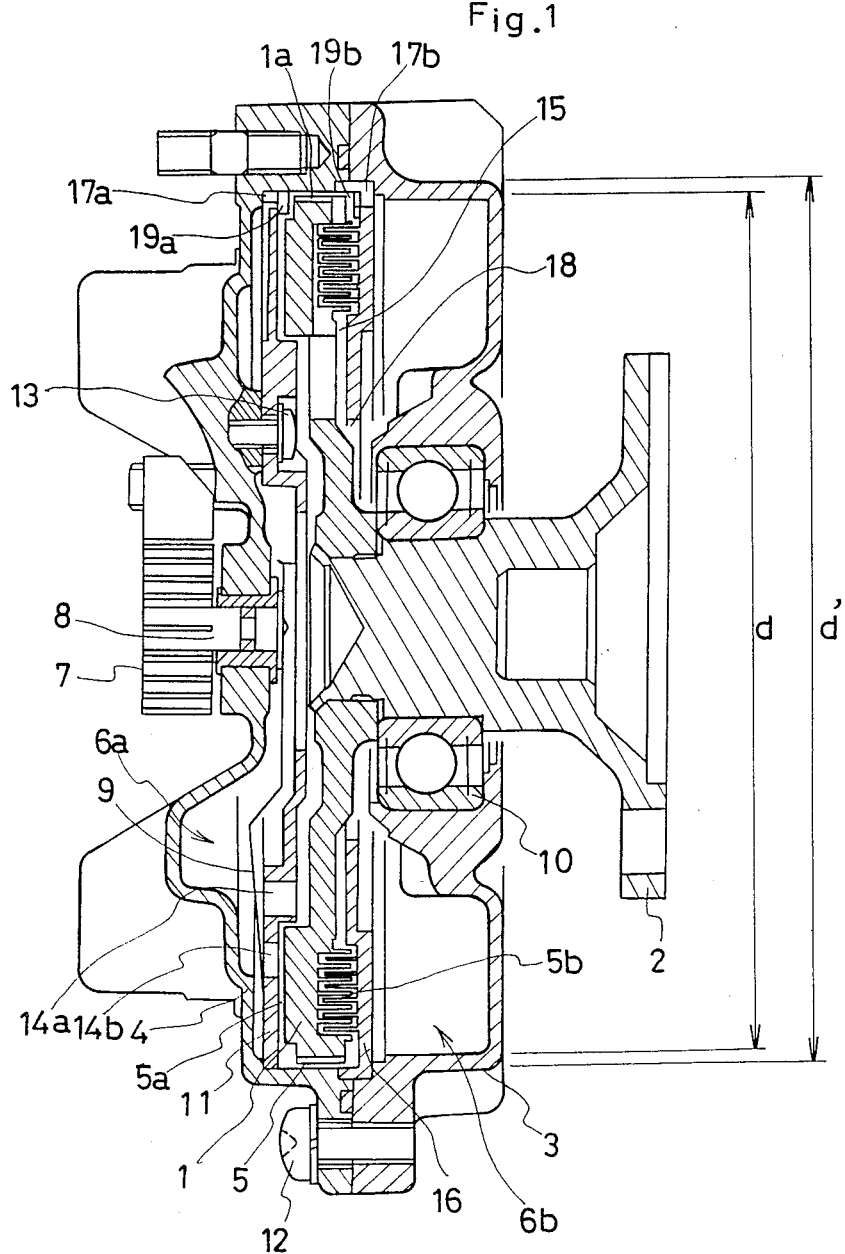
FIG. 1 is a vertical sectional view of a viscous fluid coupling according to the present invention.
Figure 2:
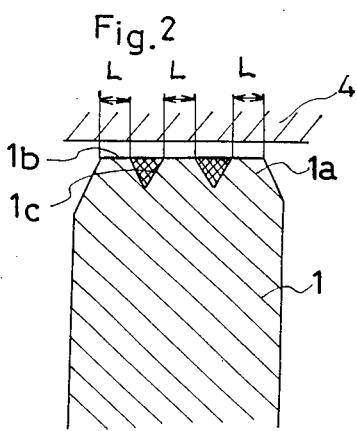
FIG. 2 is a sectional view taken along line 2—2 of FIG. 7, which shows the relationship between a rotor and a case in the viscous fluid coupling shown in FIG. 1.
Figure 3:
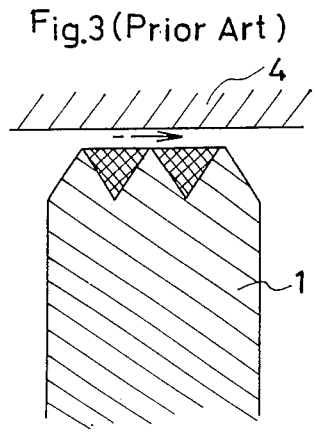
FIG. 3 is a conventional view similar to FIG. 2.
Figure 4:
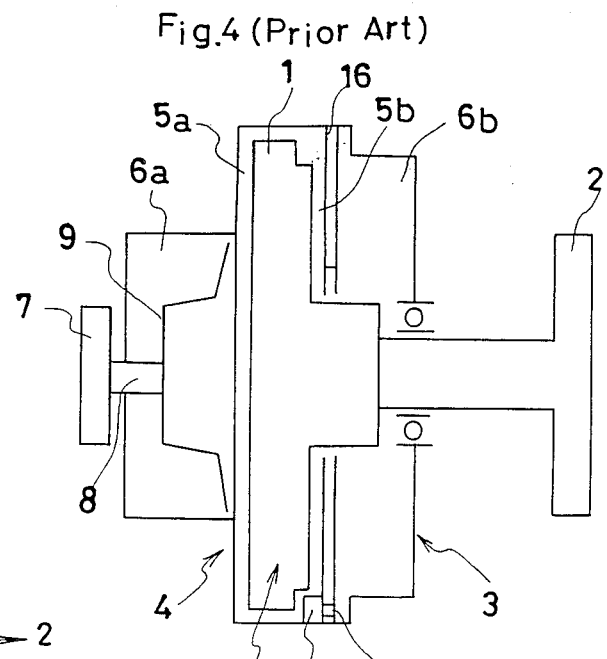
FIG. 4 is a vertical sectional view of a conventional viscous fluid coupling.
Figure 7:
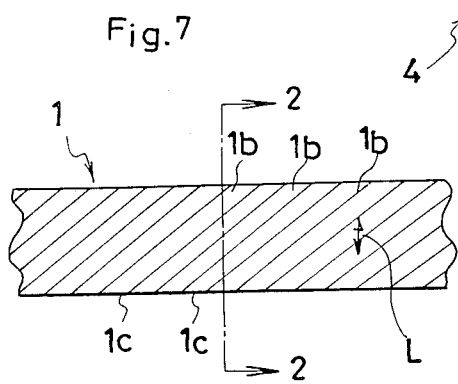
FIG. 7 is a partial developed view of the periphery of the rotor, showing the teeth.
Figure 5:
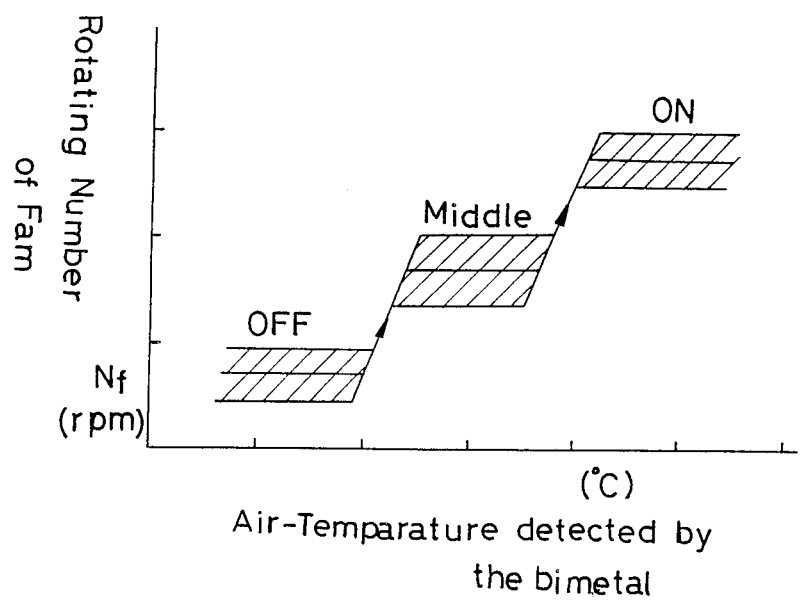
FIG. 5 is a graph which shows the relationship between a variation or scatter of the output rotational speed and the detected air temperature in the conventional viscous fluid coupling.

Referring now to FIGS. 1 and 2, there is illustrated a viscous fluid coupling according to an embodiment of the invention. It includes a rotor 1 secured to a shaft 2. On an outer periphery of the rotor 1, there are formed a plurality of angled teeth 1a, each of which is oriented toward the rotating direction of the rotor 1 to provide a pumping action during rotation of the rotor 1. A distal end of each tooth 1a is formed into a flat-shaped configuration having a predetermined width L in the axial direction of the rotor, as shown in FIG. 2.

A case 3 is mounted on the shaft 2 via a bearing 10 and is connected to a cover 4 by screws 12 to form an output member.

A front plate 11 is disposed between the rotor 1 and the cover 4, and is secured thereto by screws 13. Between the front plate 11 and the cover 4, there is defined a first reservoir 6a. A rear plate 16 is disposed between the rotor 1 and the case 3. A periphery of the rear plate 16 is held between the case 3 and the cover 4. Between the case 3 and the rear plate 16, there is formed a second reservoir 6b. Further, the fluid chamber 5 within the output member is divided into first and second fluid chambers 5a and 5b by the rotor. The first and second fluid chambers 5a and 5b are respectively defined between the rotor 1 and the front plate 11 and between the rotor 1 and the rear plate 16. A periphery of the front and rear plates 11 and 16 are respectively provided with first and second orifices 17a and 17b for respectively communicating the first fluid chamber 5a with the first reservoir 6a and the second fluid chamber 5b with the second reservoir 6b. The front plate 11 is further provided with projection 19a which is oriented towards the rotor 1. A projection 19b is formed at a neighborhood of the second orifice 17b which corresponds to the upstream side of the rotor 1. The orifice 17b and the projection 19b cooperate to pump viscous fluid from the second reservoir 6b to the second fluid chamber 5b during rotation of the rotor 1. The orifice 17a and the the projection 19a cooperate to pump viscous fluid from the first fluid chamber 5a to the first reservoir 6a during rotation of the rotor 1.

A valve 9 is connected to a thermal-responsive member 7 via a rod 8 and controls the opening-degree of a passage 14a and a passage 14b, both of which are provided on the front plate 11. Thus, the torque-transmission from the case 3 (or the case 3 and the cover 4) as the output member is controlled.

In operation, when a temperature of cooling water which circulates within an engine is low, the valve 9 closes the passage 14a and opens partly the passage 14b, thereby limiting the quantity of the fluid to be supplied from the first reservoir 6a to the first fluid chamber 5a to be at a minimum. Thus, before the fluid can move into the second fluid chamber 5b, the fluid is pumped back to the first reservoir 6a via the first orifice 17a. Under this condition, torque-transmission is low, thereby rotating a fan (not shown) secured to the cover 4 at a low speed.

As the temperature of the cooling water increases, the valve 9 opens the passage 14a and the passage 14b. Thus, a large amount of the fluid is moved into the fluid chambers 5a and 5b. Due to the movement of the fluid into the second fluid chamber 5b, torque transmission is increased and the rotational speed of the output member is also increased.

Figure 6:
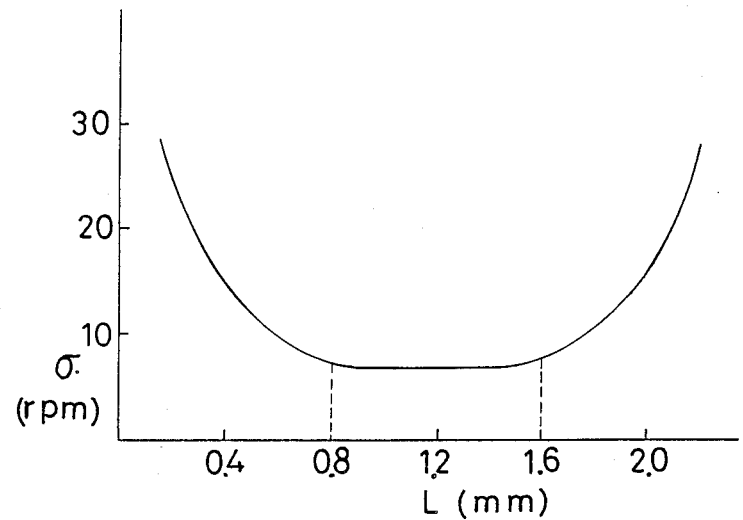
FIG. 6 is a graph which shows the relationship between the scatter of the output rotational speed and the width L of a distal end of each tooth of a rotor in the present invention.

On the other hand, in response to the rotation of the rotor 1 relative to the case 3 and cover 4, the viscous fluid is gathered around the inner periphery of the case 3 and cover 4 due to centrifugal force and is returned to the first chamber 5a due to the pumping action of the teeth 1a of the rotor 1. It should be noted that a distal end 1b of each tooth 1a is formed into a flat configuration closely facing and parallel to the inner surface of the cover 4 as shown in FIG. 2. Each flat distal end 1b has a width L in the axial direction of the rotor. The flat surfaces form a fluid-tight seal with the cover, thereby substantially preventing the return movement of the viscous fluid in grooves 1c into the second fluid chamber 1b. Thus, the pumping action of the rotor 1 is stable or constant with the result that torque-transmission is not varied. A relationship between a scatter in the torque-transmission and the width L of the distal end 1b of each tooth 1a is represented in FIG. 6. As can be seen, the scatter $\sigma$ (i.e., variation in rotational speed of the output member) is at a minimum for a width L of between 0.8 mm and 1.6 mm, and particularly between 0.8 mm and 1.2 mm.

Obviously, numerous modifications and variations of the present invention are possible in light of the above teachings. It is therefore to be understood that within the scope of the appended claims, the invention may be practiced otherwise than as specifically described herein.

What is claimed is:

1. A viscous fluid coupling comprising:
   an input member;
   an output member rotatably mounted on said input member;
   a rotor fixed to said input member and positioned in said output member so as to define two chambers on opposite sides of said rotor, said rotor having at an outer periphery thereof a plurality of teeth having distal ends closely facing an inside surface of said output member, wherein said distal ends of said teeth form flat surfaces having a predetermined width in the axial direction of said rotor and extending parallel with an opposing surface of said output member to form a rotary seal with said output member, said teeth comprising angled teeth oriented towards a rotating direction of said rotor, whereby said viscous fluid is pumped from one of said chambers to another of said chambers by said teeth during rotation of said rotor; and
   a viscous fluid in said casing, whereby torque is transmitted from said input member to said output member to rotate said output member with reduced scatter.

2. The coupling of claim 1 including V-shaped grooves formed between adjacent ones of said teeth.

3. The coupling of claim 1 wherein said width of each of said distal ends of said teeth in an axial direction of said rotor is between 0.8 mm and 1.6 mm.

4. The coupling of claim 3 wherein said width is between 0.8 mm and 1.2 mm.

* * * * *